United States Patent [19]
Grant

[11] Patent Number: 5,632,866
[45] Date of Patent: May 27, 1997

[54] POINT-OF-USE RECYCLING OF WAFER CLEANING SUBSTANCES

[75] Inventor: Donald C. Grant, Excelsior, Minn.

[73] Assignee: FSI International, Inc., Chaska, Minn.

[21] Appl. No.: 180,546

[22] Filed: Jan. 12, 1994

[51] Int. Cl.$^6$ ............................. B01D 3/34; C01B 17/90
[52] U.S. Cl. ..................... 203/12; 134/10; 134/11; 134/12; 159/DIG. 19; 203/13; 203/35; 203/40; 203/42; 203/49; 203/71; 423/394.2; 423/488; 423/531
[58] Field of Search ................... 203/12, 71, 13, 203/49, 35, 40, 42, DIG. 9; 423/531, 488, 394.2; 156/64.21, 345; 134/12, 10, 11; 202/202, 182; 159/DIG. 19

[56] References Cited

U.S. PATENT DOCUMENTS

| | | | |
|---|---|---|---|
| 3,394,056 | 7/1968 | Nadler et al. | 203/87 |
| 3,635,664 | 1/1972 | Morimoto | 423/488 |
| 4,261,791 | 4/1981 | Shwartzman | 156/638.1 |
| 4,526,650 | 7/1985 | Blomquist et al. | 156/642 |
| 4,769,180 | 9/1988 | Echigo et al. | 210/682 |
| 4,778,532 | 10/1988 | McConnell et al. | 134/10 |
| 4,855,023 | 8/1989 | Clark et al. | 134/12 |
| 4,917,123 | 4/1990 | McConnell et al. | 134/95 |
| 4,936,955 | 6/1990 | Dobson et al. | 203/40 |
| 4,971,654 | 11/1990 | Schnegg et al. | 156/642 |
| 4,980,032 | 12/1990 | Dobson et al. | 203/40 |
| 5,032,218 | 7/1991 | Dobson et al. | 156/642 |
| 5,061,348 | 10/1991 | McCormick et al. | 202/154 |
| 5,089,084 | 2/1992 | Chhabra . | |
| 5,164,093 | 11/1992 | Chilton et al. | 210/688 |
| 5,174,865 | 12/1992 | Stultz et al. | 203/12 |
| 5,185,111 | 2/1993 | Lazar | 264/49 |
| 5,188,986 | 2/1993 | Liu et al. | 437/25.5 |
| 5,242,468 | 9/1993 | Clark et al. | 29/25.01 |
| 5,277,715 | 1/1994 | Cathey | 134/2 |
| 5,288,333 | 2/1994 | Tanaka et al. | 134/12 |
| 5,290,361 | 3/1994 | Hayashida et al. | 134/2 |
| 5,294,570 | 3/1994 | Flemming, Jr. et al. | 437/239 |

FOREIGN PATENT DOCUMENTS 0747705  9/1970  Belgium ............... 423/488

OTHER PUBLICATIONS

AB VPO 6001603 A.
CA 89: 185490.
AB BE 818034.
EP 405289 A Abstract.
SU 1731723 A Abstract.

(List continued on next page.)

*Primary Examiner*—Virginia Manoharan
*Attorney, Agent, or Firm*—Faegre & Benson LLP

[57] ABSTRACT

A method of recycling and purifying cleaning chemicals used in the production of semiconductor circuits and containing hydrofluoric acid and or hydrochloric acid. Recycling of such chemicals is accomplished using separation and reconstitution steps Hydrofluoric acid and hydrochloric acid cannot be distilled directly from a chemical solution as they form azeotropes with water. A low vapor pressure substance such as sulfuric acid or phosphoric acid is used to break the azeotrope while increasing the purity of the recovered chemicals and decreasing disposal problems. The method is useable at the point of use of the chemicals.

13 Claims, 16 Drawing Sheets

OTHER PUBLICATIONS

CA 96: 62350 Abstract.
CA 95: 27209 Abstract.
CA 93: 74593 Abstract.
CA 75 50997 Abstract.
AB VP 53 001696 A.
CA 75: 50923 Abstract.
CA 78: 32156 Abstract.
CA 110: 195747 Abstract.
CA 107: 9896 Abstract.
CA 92: 113096 Abstract.
CA 90: 40907 Abstract.
CA 84: 19837 Abstract.
CA 115: 117333 Abstract.

J. Davison, C. Hsu, E. Trautmann, and H. Lee, "The Use of Reprocessed HF in Semiconductor Quartz and Wafer Cleaning Operations," Proceedings of the First International Symposium On Cleaning Technology in Semiconductor Device Manufacturing, 83 (1990).

T. Wear, "Characterization of a Hydrofluoric Acid Reprocessor" Proceedings of the 37th Annual Meeting of the Institute of Environmental Science, p. 271, May, 1991.

R. Matthews, "In–Situ Gas Generated Aqueos Chemicals And Their Impact on Chemical Purity," Proceedings, Semiconductor Pure Water and Chemicals Conference, pp. 3–15, (1992).

J. Davison, "Acid Reprocessors–Part I: Piranha or Sulfuric Acid Reprocessor", Solid State Technology pp. S1–S5, Mar. 1992.

J. Davison, "Acid Reprocessor–Part II: The HF Reprocessor" Solid State Technology, pp. S10–S14, Jul. 1992.

G. Carr, "Continuous Chemical Repurification" Semiconductor International, pp. 104–107, Jun. 1993.

F, Wang, D. Charest, J. Campaneria, L. Wai, I. Lye, S. Yeo, C. Sing, K. Tey, D. Kaur, D. Grant, D. Smith and P. Palm, "Design, Certification and Verification of Technology For Delivering Sub–ppb, Low–Particle Chemicals to Semiconductor Cleaning Baths in Wafer Fabs," 40th Annual Technical Meeting Institute of Environmental Sciences, May 1994.

D. Deal and D. Grant, "Chemical Delivery Systems: Past, Present and Future," The Electrochemical Society Meeting, May 1994.

D. Grant, B. Liu, W. Fisher and R. Bowling, "Particle Capture Mechanisms in Gases and Liquids: An Analysis of Of Operative Mechanisms in Membrane/Fibrous Filters," Annual Technical Meeting of the Institute of Environmental Sciences, pp. 43–51, May 1988.

Figure 2

| Experiment Number | Absorber Column | Volumetric Mix Ratio H$_2$SO$_4$:HCl | Nitrogen Purge Method | Absorption Duration (hours) | Ultimate Recovery (%) |
|---|---|---|---|---|---|
| 1 | Glass | 1:1 | Surface | 0.4 | - |
| 2 | Glass | 2:1 | Surface | 0.4 | 79.3 |
| 3 | Glass | 2:1 | Surface | 22 | 101.6 |
| 4 | Glass | 1:1 | Surface | 120 | 98.9 |
| 5 | Glass | 1.3:1 | Surface | 40 | 99.9 |
| 6 | Glass | 2:3 | Surface | 20 | 4.4 |
| 7 | Glass | 1:1 | Surface | 24 | 95.2 |
| 8 | Plastic | 1:1 | Surface | 48 | 96.2 |
| 9 | Plastic | 1:1 | Surface | 140 | 102.6 |
| 10 | Plastic | 0:1 | Surface | 21 | <0.1 |
| 11 | Plastic | 0:1 | Thru Liquid | 10 | <0.1 |
| 12 | Plastic | 1:1 | Thru Liquid | 22 | 97.3 |
| 13 | Plastic | 1.5:1 | Thru Liquid | 26 | 99.9 |

Figure 10

| Element | Contaminated Solution, ppb | Reconstituted Solution, ppb | Removal Efficiency |
|---|---|---|---|
| Calcium | 521 | <0.01 | >99.998 |
| Copper | 576 | <1.0 | >99.8 |
| Iron | 525 | <0.05 | >99.99 |
| Sodium | 569 | <0.01 | >99.998 |

Figure 11

| Element | Contaminated Solution, ppb | Reconstituted Solution, ppb | Removal Efficiency |
|---|---|---|---|
| Calcium | 20,018 | 0.025 | 99.9999 |
| Copper | 19,288 | <1.0 | >99.995 |
| Iron | 19,707 | <0.05 | >99.9998 |
| Nickel | 23,968 | <1.0 | >99.996 |
| Potassium | 29,000 | 0.075 | 99.9997 |
| Sodium | 12,350 | <0.01 | >99.9999 |

Figure 12

| Element | Contaminated Solution, ppb | Reconstituted Solution, ppb | Removal Efficiency |
|---|---|---|---|
| Arsenic | 272 | <1.0 | >99.6 |
| Magnesium | 15 | <1.0 | >93 |
| Tin | 97 | <1.0 | >99 |
| Zinc | 152 | <1.0 | >99.3 |
| Zirconium | 22 | <1.0 | >95 |

Figure 15

| Element | Contaminated Solution, ppb | Reconstituted Solution, ppb | Removal Efficiency, %* |
|---|---|---|---|
| Aluminum | 8,950 | <0.10 | >99.999 |
| Calcium | 12,700 | 1.2 | 99.999 |
| Chromium | 8,994 | <.010 | NA |
| Copper | 13,555 | <0.10 | >99.999 |
| Iron | 10,705 | 0.20 | 99.999 |
| Potassium | 18,510 | 0.20 | 99.9998 |
| Sodium | 9,280 | 2.3 | >99.9999 |
| Nickel | 14,440 | 0.25 | >99.999 |

POINT-OF-USE RECYCLING OF WAFER CLEANING SUBSTANCES

This invention was made with Government support under Contract No. AAH01-93-C-R209 awarded by the U.S. Army Missile Command. The Government has certain rights in the invention.

BACKGROUND OF THE INVENTION

1. Field of the Invention

This invention relates to apparatus and methods for generating or regenerating chemical substances, and more particularly to a method of recycling high purity hydrofluoric acid and hydrochloric acid. The method of this invention is particularly useful for point-of-use generation and recycling of high purity wafer cleaning chemicals.

2. Background Information.

Ultra large scale (ULSI) semiconductor devices manufactured today incorporate design line widths which are less than a micron, and dielectric films which are thinner than 300 angstroms. These features, which are expected to become even smaller over time, are extremely sensitive to contamination during their manufacture. As feature size decreases, the circuit devices, commonly referred to as chips or wafers, will become even more sensitive to contamination.

Contaminants which adversely effect ULSI devices come in various forms. Particles can cause open or shorted circuits and non-integral dielectric films. Organic and inorganic conlaminants, both metallic and nonmetallic, can result in poor film quality and decreased device performance and reliability. Metallic contaminants can be especially damaging. Taken as a whole, contaminants result in a large portion of device yield loss.

The processes presently used in the fabrication of ULSI devices rely heavily on chemical reagents, both gaseous and liquid. Wet cleaning solutions presently account for approximately 25% of the steps used in wafer manufacturing. In general, liquid reagents used in these processes contain much higher levels of contaminants than do gaseous reagents. In view of these contamination levels, the wafer manufacturing industry is attempting to decrease the reliance on liquid chemicals. However, gas phase cleaning procedures have proved difficult to develop, especially procedures for removal of particles and metallics. Hence, liquid based cleaning procedures are expected to be used for at least another decade. Thus reduction of contamination in these liquids is highly desirable. The industry predicts that tenfold reductions in contaminants every three to four years are required.

In a typical facility, relatively large volumes of liquefied chemicals are used in cleaning. An estimate of the volume of chemical usage by a large facility producing state of the art ULSI devices is as follows:

| Chemical Type | Usage (L/mo.) |
| --- | --- |
| 96% Sulfuric acid | 30000–60000 |
| 30% Hydrogen peroxide | 20000–40000 |
| 28% Ammonium hydroxide | 10000–20000 |
| 37% Hydrochloric acid | 5000–10000 |
| 49% Hydrofluoric acid | 5000–10000 |

These chemicals are highly toxic, highly corrosive and can pose environmental costs associated with their distribution, use and disposal. Large volumes of additional chemicals are required to neutralize the spent chemicals. The cost of treating the spent chemicals sometimes exceeds the cost of purchasing the chemical. Considerable cost reductions could be achieved if the chemical usage was reduced or if the chemicals were recycled.

In the past, various methods have been used or proposed to recycle liquids such as those listed above. Examples of such methods include carbon adsorption, reverse osmosis, ion exchange, membrane filtration, ultrafiltration and distillation However, these devices and methods have significant limitations and shortcomings.

Despite the need in the art for an a recycling method for cleaning chemicals such as aqueous hydrochloric acid (HCl), hydrofluoric acid (HF), hydrobromic acid (HBr) and nitric acid ($HNO_3$), which overcomes the shortcomings and limitations of the prior art, none insofar as is known has been developed or proposed. Accordingly, it is an object of the present invention to provide a method of recycling HCl and HF used in various chemical processes which overcomes the limitations and shortcomings of the prior art. It is a particular object of this invention to provide a method which is useful for regenerating high purity hydrochloric acid and hydrofluoric acid used in the manufacture of ULSI circuits. Yet another object of this invention is to provide a method which is useable at the point of use of these cleaning chemicals, thus increasing manufacturing yields of ULSI circuits and reducing manufacturing costs.

SUMMARY OF THE INVENTION

In its most basic form, the present invention provides a method for separating an acid selected from the group consisting of hydrochloric acid, hydrofluoric acid, hydrobromic acid and nitric acid from a liquid mixture comprising the acid and water, comprising the steps of:

a. adding a predetermined amount of a low vapor pressure substance to the acid-water mixture to form a reaction mixture;

b. separating the reaction mixture to form an aqueous solution of the low vapor pressure substance and a gas consisting of the acid and water vapor; and c. reconstituting the gas with water to form the acid in an aqueous state.

In a preferred embodiment, the present invention provides a method for recycling liquid cleaning compounds at their point of use, which compounds contain an acid selected from the group consisting of hydrochloric acid, hydrofluoric acid, hydrobromic acid and nitric acid, from a liquid mixture comprising the acid, water and contaminants, the method being adaptable for use in a closed loop process for production of integrated circuits, comprising the steps of.

a. adding a predetermined amount of a low vapor pressure substance such a sulfuric acid or phosphoric acid, at a predetermined rate, to the acid-water mixture to form a reaction mixture of a volumetric ratio between 1:1 and 2:1 low vapor pressure substance to acid;

b. controlling the temperature of the reaction mixture;

c. separating the reaction mixture to form an aqueous mixture of the low vapor pressure substance and a gas consisting of the acid and water vapor; and d. absorbing the gas into water to form the regenerated aqueous acid.

The benefits of this invention will become clear from the following description by reference to the drawings.

BRIEF DESCRIPTION OF THE DRAWINGS

FIG. 2 is a chart showing the results of experimental examples.

FIG. 10 is a chart showing removal efficiency (purity) of various contaminants (by element) in an HCl recovery.

FIG. 11 is a chart showing elemental removal efficiency.

FIG. 12 is a chart showing elemental removal efficiency with respect to additional elements in the example of FIG. 11.

FIG. 15 is a chart showing elemental removal efficiency of an HF recovery.

DESCRIPTION OF THE PREFERRED EMBODIMENT

1. Background

Figure 1:
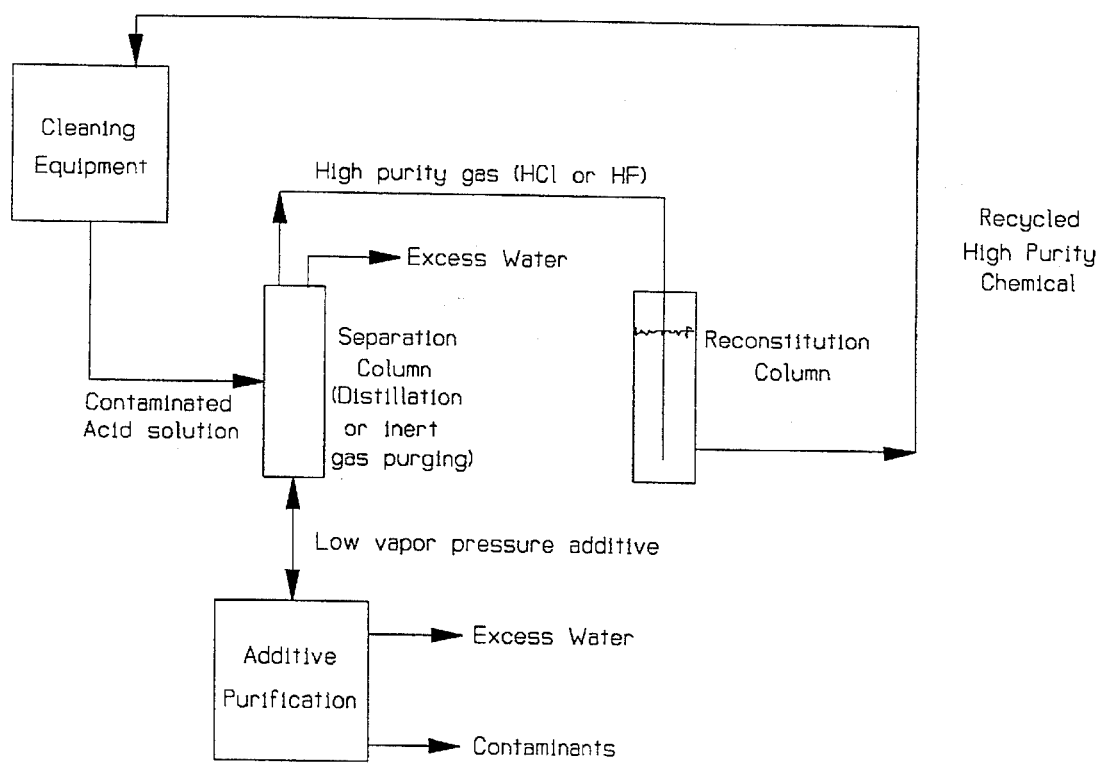
FIG. 1 is a flow diagram of the method of the present invention.

Wafer cleaning today is largely based on the "RCA cleans" developed in the early 1970s. Four different chemical mixtures are typically used:

| Chemical constituents | Typical Mix Ratio | Type(s) of Contaminant Removed |
| --- | --- | --- |
| Sulfuric acid, hydrogen peroxide | 4:1 | Organics |
| Ammonium hydroxide, hydrogen peroxide, DI water | 1:1:5 | Particles, Organics, Metallics |
| Hydrochloric acid, hydrogen peroxide DI water | 1:1:5 | Metallics |
| Hydrofluoric acid, DI water | 1:100 | Oxides, Metallics |

These mixtures are often used in combination to achieve a level of surface cleanliness required in subsequent processing steps. The mix ratios are varied to obtain optimum cleaning performance. The chemicals used must be of high purity to prevent recontamination of surfaces.

Most of the cleaning chemicals used, such as sulfuric acid, ammonium hydroxide, hydrochloric acid and hydrofluoric acid, are manufactured by absorbing a gas into water. Hence, the purity of the chemical is determined by the purity of the gas and water used and the cleanliness of the absorption equipment. The technology for producing high purity gases and water is well developed. Metals and metal salts have low vapor pressures so most contamination in gases is in the form of particles. Particles are easily removed from gases; essentially complete retention (greater than 99.99999999%) of all particles is possible with presently available membrane filters. Water can be purified by a combination of unit processes including carbon adsorption, reverse osmosis, ion exchange, membrane filtration and ultrafiltration. Extremely low levels of contaminants can be achieved in a properly maintained system. Hence, extremely high purity chemical can be produced at the point of use, a semiconductor fabrication facility. In addition, contamination associated with storage and shipping is eliminated if this operation is performed at the point of use.

Unlike the gas and water purification steps used to initially generate cleaning chemicals at the point of use, recycling of these liquid cleaning chemicals at the point of use, for example by distillation or ion exchange, is extremely difficult. Insofar as is known no one has accomplished such recycling at the point of use for hydrochloric acid. Although hydrofluoric acid has been recycled via ion exchange, only dilute solutions can be processed and recovery of only a portion of the acid is possible.

Carefully controlled distillation has been applied successfully in the purification of sulfuric acid. Distillation of sulfuric acid is advantageous because the contaminants, mainly metallics, typically found in sulfuric acid have low vapor pressures. Distillation of spent chemical allows essentially closed loop chemical usage of high purity chemicals. Hence, it solves both the purity and disposal problems associated with liquid chemicals. Unfortunately, products based on this technology have suffered from mechanical problems and are just beginning to gain acceptance, presumably due to the high temperatures (>300° C.) associated with sulfuric acid dissolution.

The use of distillation for recycling of cleaning chemicals other than sulfuric acid has not been investigated insofar as is known. Both hydrochloric acid and hydrofluoric acid form azeotropes with water. An azeotropic mixture is one in which the composition of the vapor phase is the same as that of liquid phase. Because of the formation of azeotropes, distillation is not a practical way to recover hydrochloric acid or hydrofluoric acid from water.

Another potential complication associated with recovery of these chemicals by distillation is the presence of hydrogen peroxide in the mixtures. Hydrogen peroxide does, however, decompose rapidly at high temperatures to form water and oxygen. Hence, it should not pose a major problem. In addition, the potential problem is eliminated if ozone, rather then hydrogen peroxide, is used as the oxidant because ozone decomposes more readily.

2. Technical Discussion

In the method of the present invention, HCl is separated from an HCl-water solution by adding a low vapor pressure substance such as sulfuric acid or phosphoric acid. Similarly, HF, HBr and $HNO_3$ may be separated from an acid-water solution by adding the low vapor pressure substance. Azeotropes formed between HCl and HF gases, for example, and liquids are broken by adding the low vapor pressure acid to the solution. The effect of the low vapor pressure (high boiling point) component is twofold: it greatly increases the vapor pressure of the gas dissolved in the liquid while decreasing the vapor pressure of the liquid. The gas is then easily removed from the mixture either by distillation or by bubbling an inert gas through the mixture. The removed gas is subsequently reconstituted by condensation or by being absorbed into high purity DI water.

Referring to FIG. 1, which shows a flow chart of the basic method for recycling HCl, HF, HBr and HNO$_3$ of this invention, spent gas/liquid chemical solution from a chemical process is charged to a separation column where it is mixed with a very low vapor pressure component. The gas is then removed from the column by either distillation, inert gas purging, or both processes. As the gas is removed it is absorbed into high purity DI water in an absorption column. Alternatively, reconstitution may be accomplished via condensation. The reconstituted chemical solution is returned to the chemical process. The mixture containing the low vapor pressure component is transferred to a distillation column for repurification. Excess water is removed either from the separation column or during repurification of the low vapor pressure component. Alternatively, it can be removed in a preconditioning column via distillation.

Sulfuric acid or phosphoric acid are used to break the azeotrope between HCl and water, and between HF, HBr or HNO$_3$ and water. Both substances have a very low vapor pressure (high boiling point) compared to both solutions and are available in large quantities in semiconductor fabrication facilities. In addition, the technology for recovery of such acids by distillation is known. The low vapor pressure acid is added to form a reaction mixture of a volumetric ratio between 0.4:1 and 2:1 low vapor pressure acid to cleaning acid. The preferred ratio is between :1 and 2:1. HCl is then easily removed from the HCl/acid/H$_2$O, for example, mixture by gas purging. The separation can be performed at a relatively low temperature ($\leq 120°$ C.). Hence, the problems associated with acid distillation should not be encountered in commercial practice.

Figure 3:
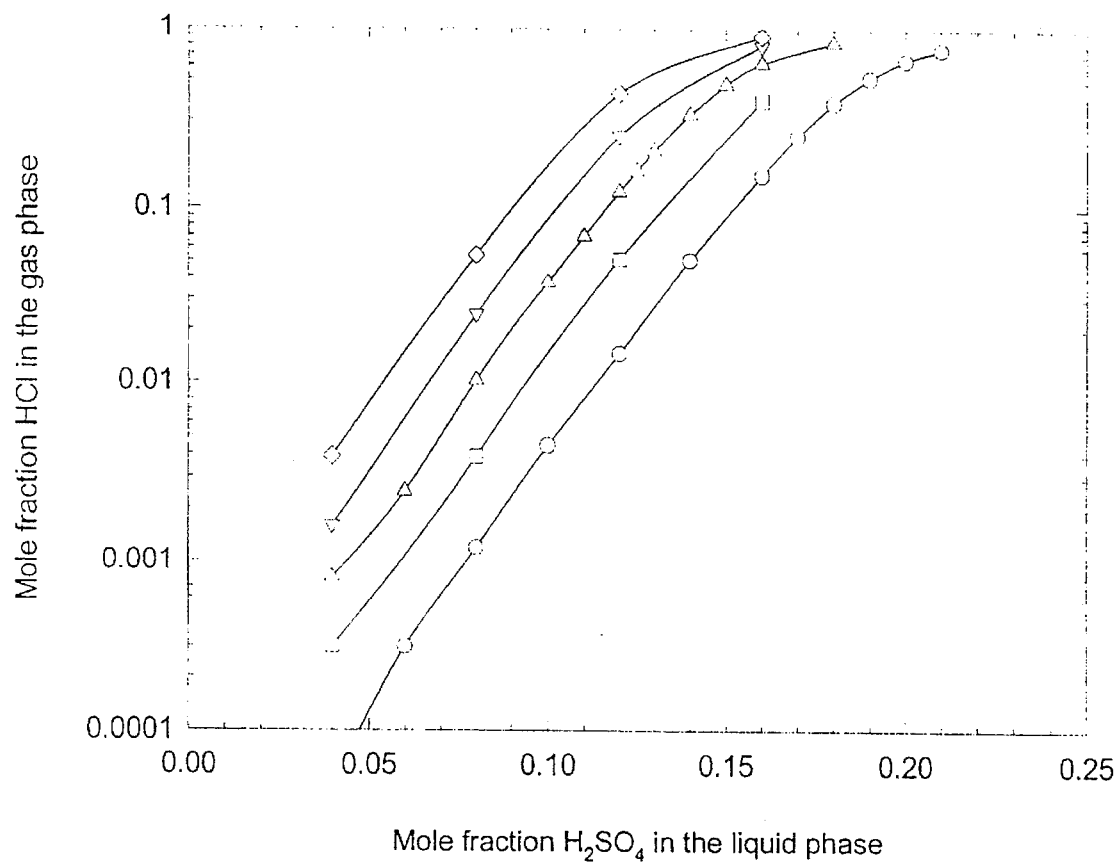
FIG. 3 is a graph showing the concentration of HCl in the gas phase as a function of the concentration of sulfuric acid ($H_2SO_4$) in the liquid phase.
Figure 4:
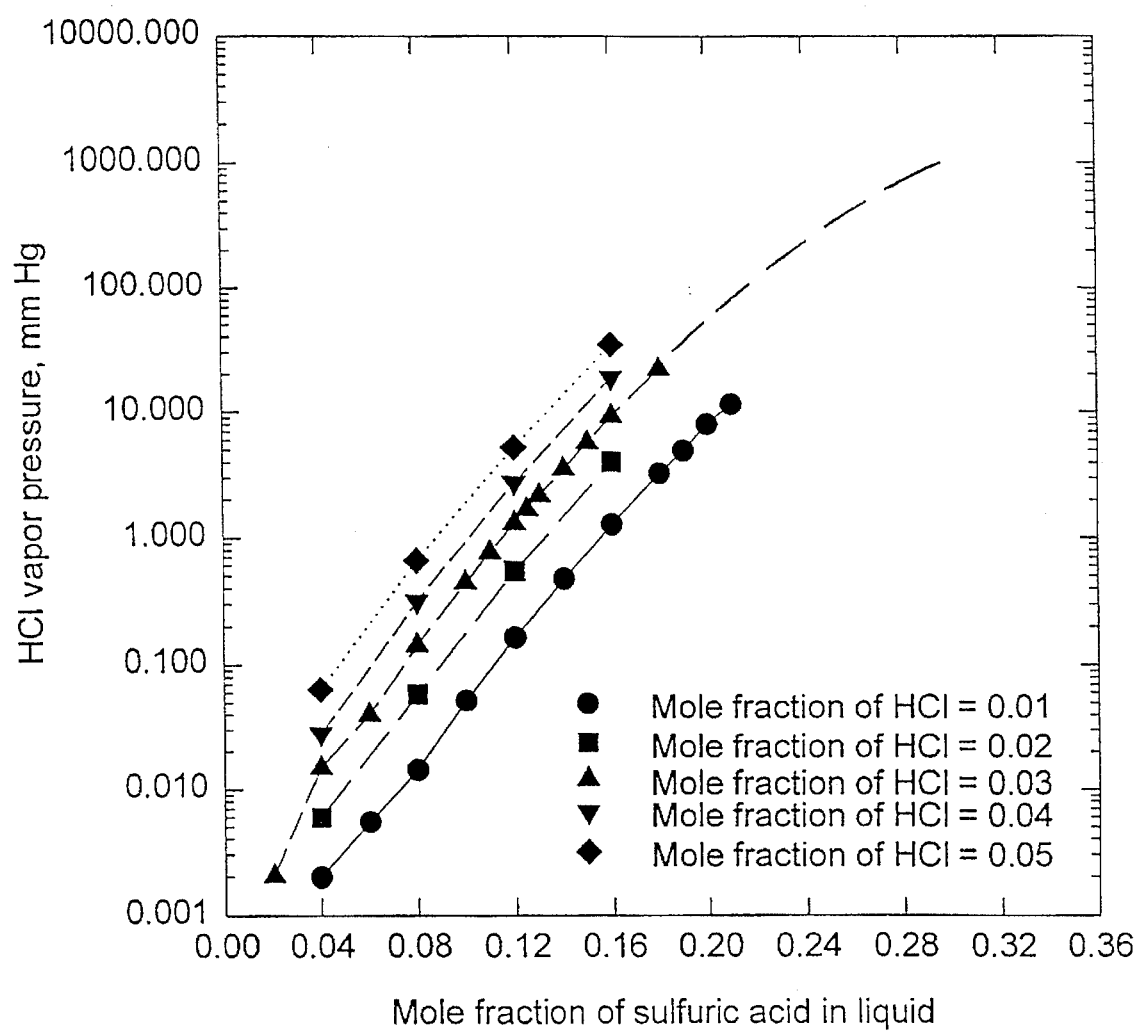
FIG. 4 is a graph of vapor pressure of HCl as a function of $H_2SO_4$ concentration.

The graph of FIG. 3 shows the effect of adding sulfuric acid on the vapor composition over HCl mixtures at 25° C. Curves for different HCl concentrations are shown. This indicates that the small changes in the amount of sulfuric acid added have a dramatic effect on the vapor composition.

For a solution with a HCl mole fraction of 0.03, the mole fraction of HCl in the vapor increases from 0.0001 to 0.8386 when the sulfuric acid mole fraction is increased flora 0.02 to 0.18, an 8000 fold increase. It should be noted that for all of the conditions described in FIG. 2, the mole fraction of sulfuric acid in the vapor was undetectable (<0.0000). In addition, HCl may be completely removed from sulfuric acid by inert gas purging or distillation.

The physical properties of HF, HBr and HNO$_3$ solutions are similar to those of HCl solutions. Sulfuric acid has been used as a dehydrating agent for HF and the relationship between the vapor and liquid compositions of the HF-water-sulfuric acid system have been studied.

Figure 16:
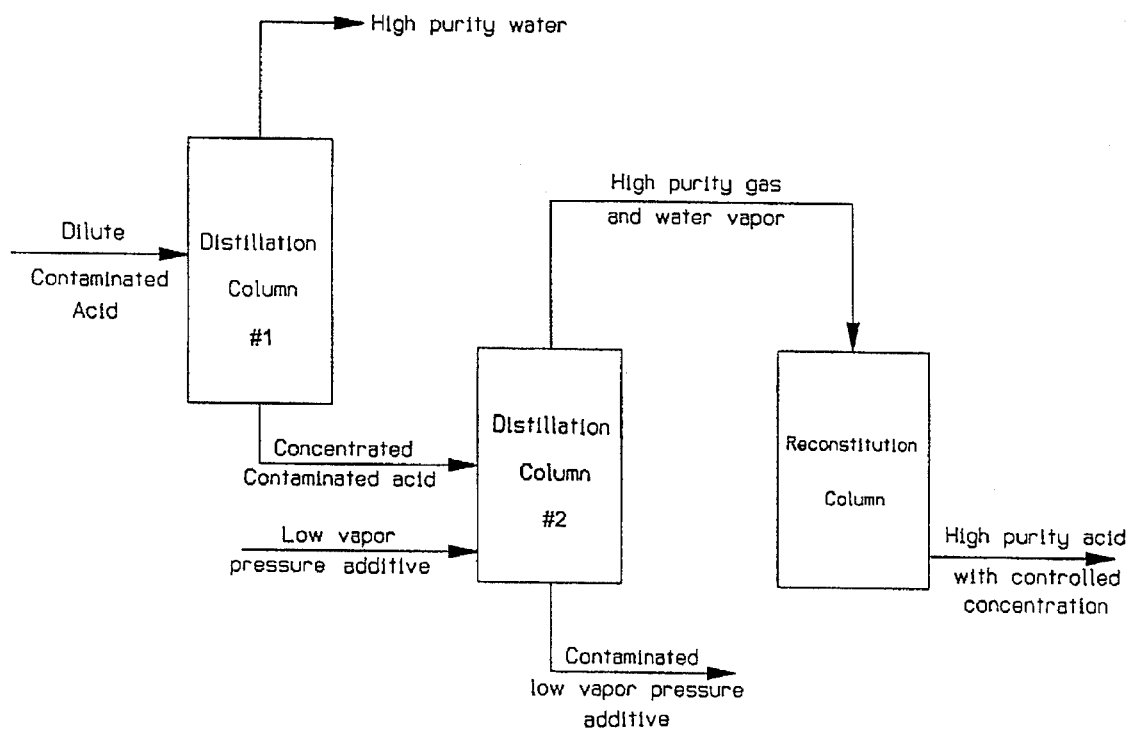
FIG. 16 is a schematic diagram of a system used to process cleaning chemicals using the process of this invention.

FIG. 16 shows a system, utilizing the method of this invention, for continuously purifying HCl, HF, HBr and HNO$_3$ in a ULSI circuit fabrication facility for example. A first distillation column is used to remove water and a second column removes contaminants. By maintaining a constant temperature in the columns, the concentration of high purity acid exiting the second column is controlled. This system also allows recycling of large quantities of waste acid. For example, if the maximum allowable contaminant in the low vapor pressure additive is 20,000 ppb and the input waste acid contains 10 ppb ( a fairly high contamination level by semiconductor industry standards) then the additive can be used to process a volume of waste acid which is 2000 times that of the additive. Thus, even if it is assumed that the additive cannot be recycled, this system reduces the volume of waste chemical by a factor of 2000. A final benefit of this system is that the water exiting the first column is of very high purity and can be recycled to a water producing process.

3. Experimental Results

Figure 5:
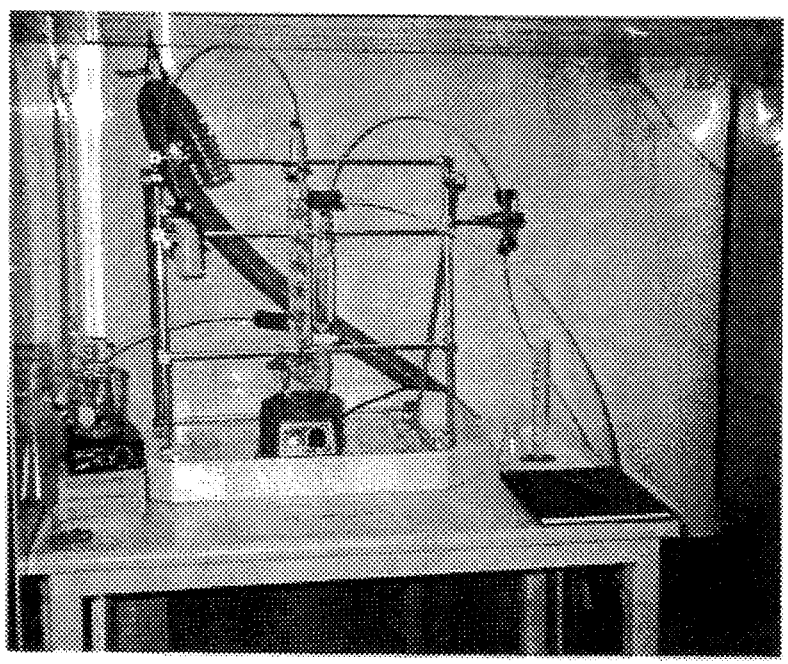
FIG. 5 is a side view of an apparatus for implementing the method of the present invention.

To more fully illustrate the present invention, the following non-limiting examples are presented. A system used to conduct the examples is shown in FIG. 5. The system was operated in a class 100 clean room and comprises a mix vessel, a condenser tube, a burette and an absorption column. These components are constructed of high purity glass. The mix vessel was supported on a heater/stirrer to allow mixing and heating of the solution in the mix vessel. A thermometer was included to allow measurement of the mixture temperature. The absorption column consisted of a glass tube containing water through which evolved gas was bubbled. In an alternative embodiment, a porous glass frit may be disposed on the end of a submerged tube in the absorption column to form small gas bubbles for rapid gas absorption. However, the rate of absorption was found to sufficient to achieve high HCl and HF recoveries even with large bubbles. The separation column or condenser tube houses a high surface area packing material to allow multiple separation stages in the column. The system is preferably constructed of materials which have low metallic extractable contents such as high purity quartz or Teflon® 440HP. Teflon 440HP is the preferred Teflon material because it has low HF extractables. Teflon must be used in an HF separation due to the incompatibility of HF with quartz. The transport tube from the condenser to the absorber is preferably Teflon PFA tubing.

A. HCl Recovery

Contaminated HCl, was prepared by adding calcium chloride, copper chloride, iron chloride, nickel chloride and sodium chloride to a 6:1 mixture (V/V) of 37% HCl:water. This ratio produces a mixture which has a normality of 1.76. Sufficient chloride salts were added to result in metallic contaminant concentrations of approximately 500 ng/liter (ppb) per metallic impurity in the final mixture. These contaminants are harmful to semiconductor devices and are commonly found in spent manufacturing chemicals.

HCl recovery experiments were performed using the following procedure:

1. The mix vessel was charged with a measured amount of a 1.76 molar solution of contaminated HCl and water (approximately 5% by weight HCl; approximately 0.03 mole fraction HCl).

2. The absorber column was filled with a measured amount of high purity DI water.

3. The burette was filled with a measured amount of sulfuric acid.

4. The sulfuric acid was added to the mix vessel over a 3–30 minute period. The volume of sulfuric acid added and the temperature of the mixture were monitored. The mix vessel and absorption column were observed.

5. Once all the sulfuric acid was added, nitrogen was purged through the mix vessel to transport the evolved HCl gas to the absorption column. The purge gas was either passed over the surface or bubbled through the liquid in the mix vessel. The purge gas flow rate was controlled at approximately 20 milliliters/minute.

6. The absorber DI water was replaced and assayed at defined intervals to determine the extent of HCl recovery.

7. The concentration of HCl in the DI water was measured by titrating with 2.0N sodium hydroxide using a 25 ml. burette. The end point of the titration was detected using phenolphthalein as an indicator.

A summary of the conditions used in the examples is shown in FIG. 2. The recovery of HCl in each example is also shown. The table indicates that recovery of HCl is essentially complete (100±5%) in examples in which the volume mix ratio of sulfuric acid:hydrochloric acid solution was greater than or equal to 1:1 and the examples were run for 20 hours or more. The examples in which no sulfuric acid was added indicated no measurable recovery of HCl. Hence, the addition of sulfuric acid is shown to be highly effective at evolving HCl gas from aqueous solutions. Additionally, absorption is shown to be effective in reconstituting the evolved gas.

The purity of the reconstituted acid and the residual sulfuric acid was analyzed using a combination of inductively coupled plasma-mass spectroscopy (ICP-MS) and graphite furnace atomic absorption (GFAA), and Ion chromatography (IC). ICP-MS or GFAA may be used to analyze for metals. IC may be used to measure chloride concentrations in the sulfuric acid and sulfate ions in the hydrochloric acid. The concentration of HCl in the reconstituted chemical and the concentration of sulfuric acid remaining in the separation column may be determined by measuring the specific gravity of the liquids or by titration. FIG. 10 shows the results of an example run to determine the purity of the reconstituted acid, wherein the contaminated solution was spiked with approximately 500 ppb of contaminants. FIG. 11 shows the results of an example run to determined the purity of the reconstituted acid, wherein the contaminated solution was spiked with approximately 20,000 ppb of contaminants. FIG. 12 shows the removal efficiency of various contaminants that were found, but not intentionally added to the initial solution of the example of FIG. 11. In these examples, the recovered HCl contained less than 0.5 ppm sulfuric acid and the residual sulfuric acid solution contained less than 0.1 ppm HCl.

Figure 6:
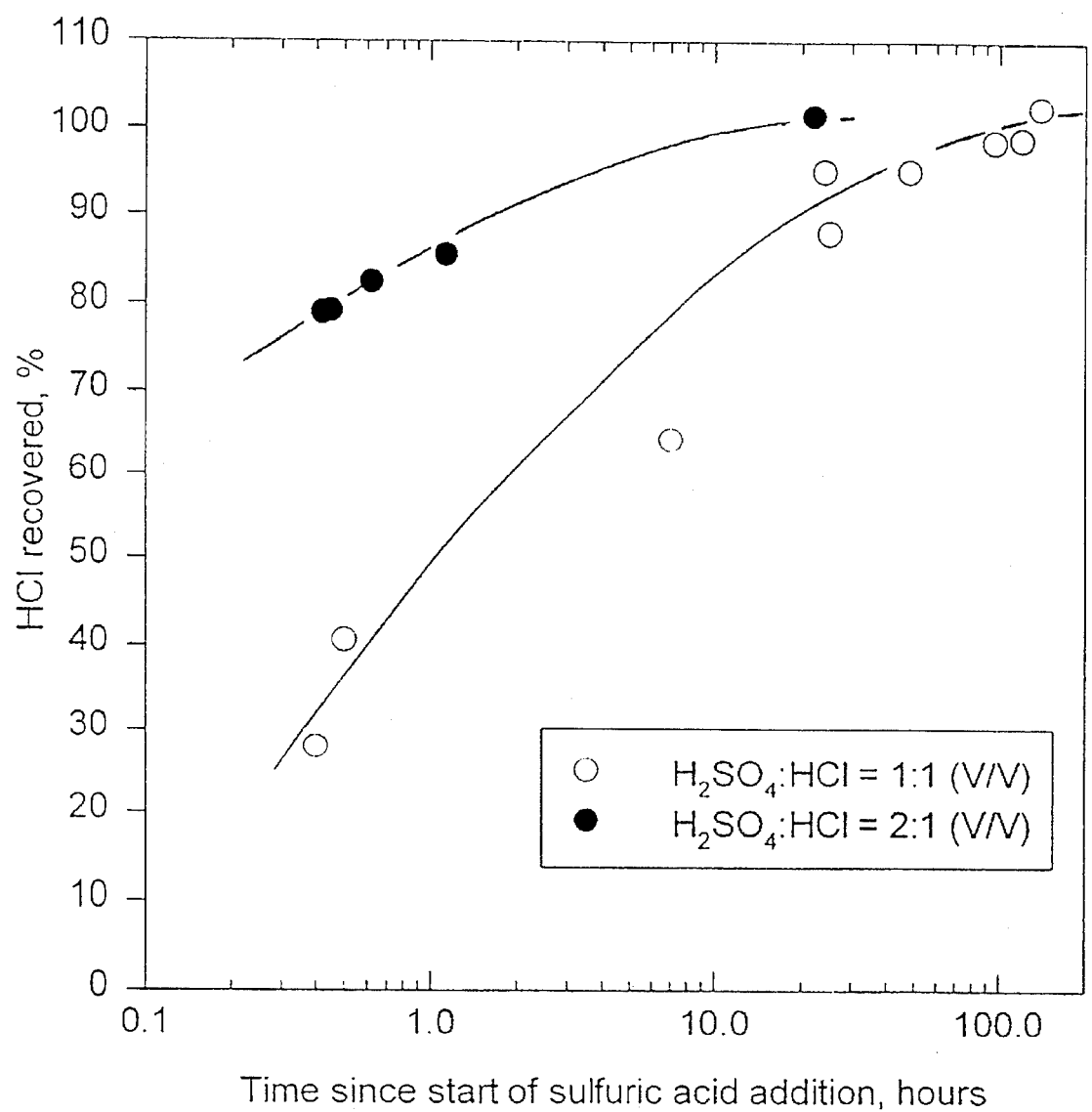
FIG. 6 is a graph showing the effect of liquid volumetric mix ratio on HCl recovery with a surface nitrogen gas purge.
Figure 7:
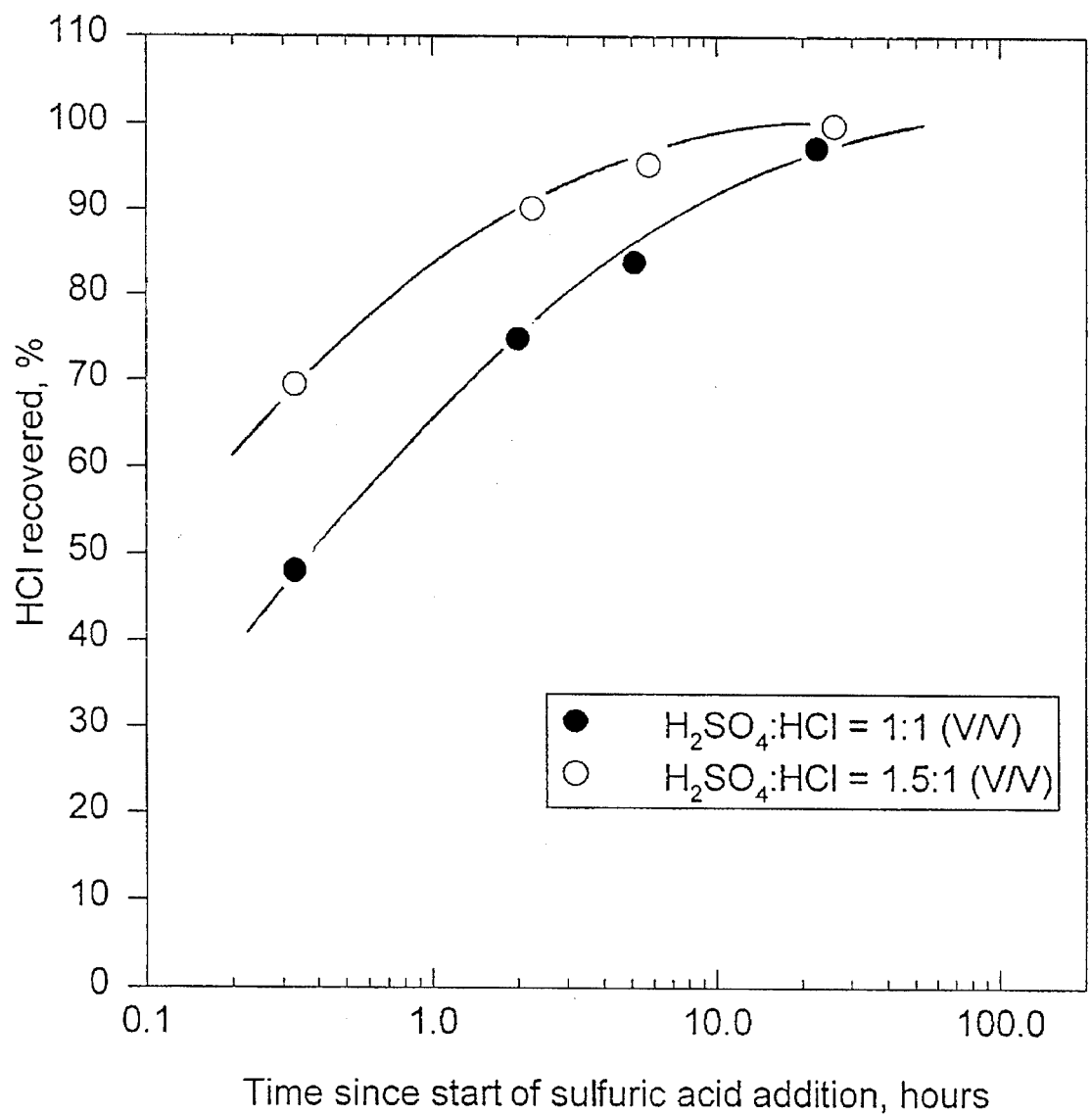
FIG. 7 is a graph showing the effect of liquid volumetric mix ratio on HCl recovery with a nitrogen gas purge through the liquid.

The effect of the mix ratio on the recovery of HCl is shown in FIGS. 6 and 7. FIG. 6 presents HCl recovery as a function of time when a nitrogen purge over the liquid surface was used to transport the HCl from the mix vessel to the absorption column. Recoveries for mix ratios of 1:1 and 2:1 (sulfuric acid:HCl mixture) are shown. These mix ratios correspond to sulfuric acid mole fractions of 0.25 and 0.40, respectively. FIG. 7 shows recoveries achieved when the nitrogen purge gas was bubbled through the liquid in the mix vessel. Recoveries for mix ratios of 1:1 and 1.5:1 are shown. A 1.5:1 mix ratio corresponds to a sulfuric acid mole fraction of 0.34.

The results shown in FIGS. 6 and 7 both indicate that increasing the amount of sulfuric acid added to the HCl mixture increases the rate of HCl recovery. This is probably due to the resultant increase in vapor pressure of HCl over the mixture.

Figure 8:
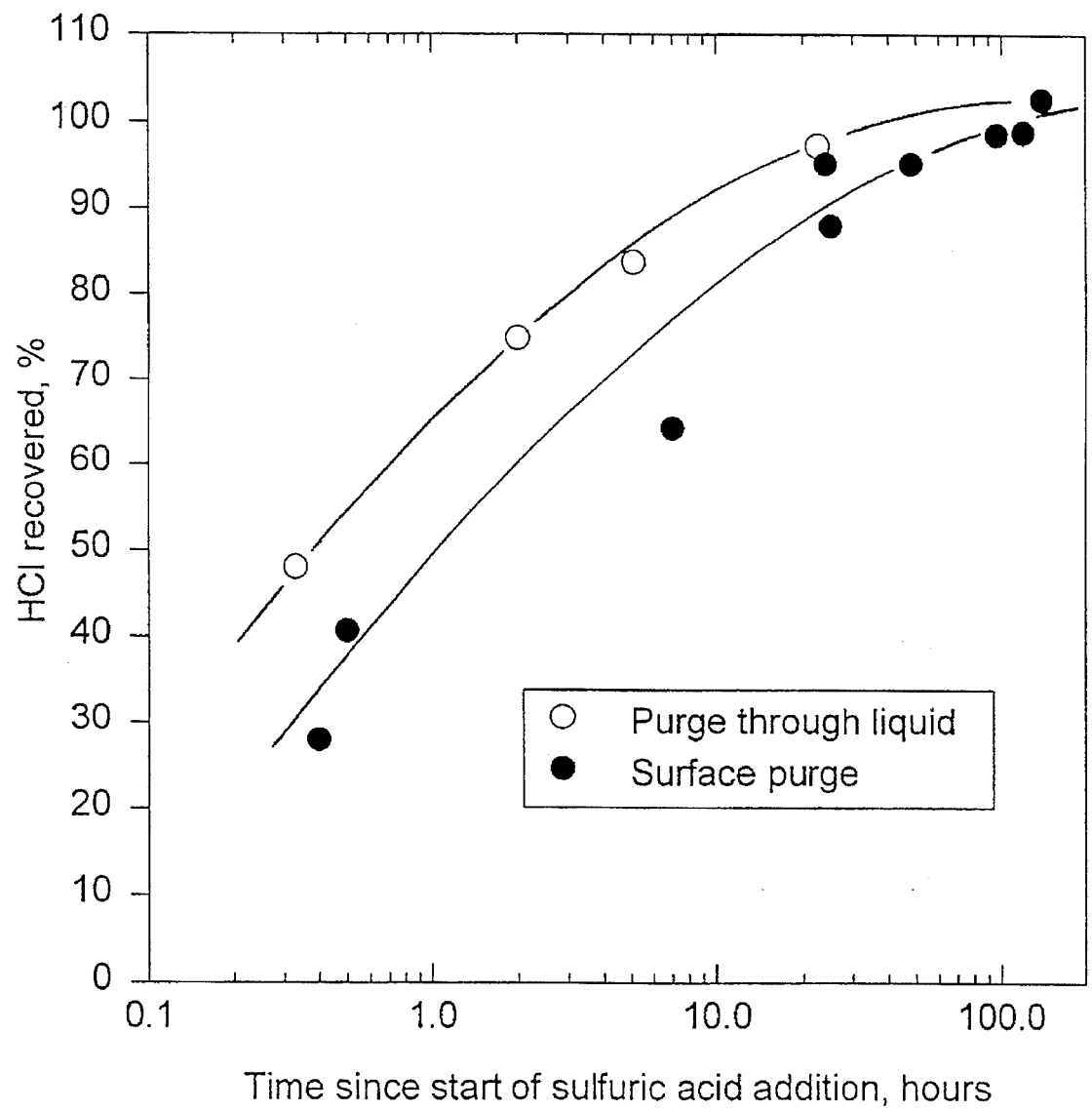
FIG. 8 is a graph showing the effect of purge method on HCl recovery.

FIG. 8 compares the effectiveness of the two nitrogen purge methods for HCl recovery. Data are included for examples in which the liquid mix ratio was 1:1. The curves indicate that purging through the liquid is more effective than purging across the liquid surface. Purging through the liquid probably increases the gas surface area in contact with the liquid, thereby increasing the rate of mass transfer.

Figure 9:
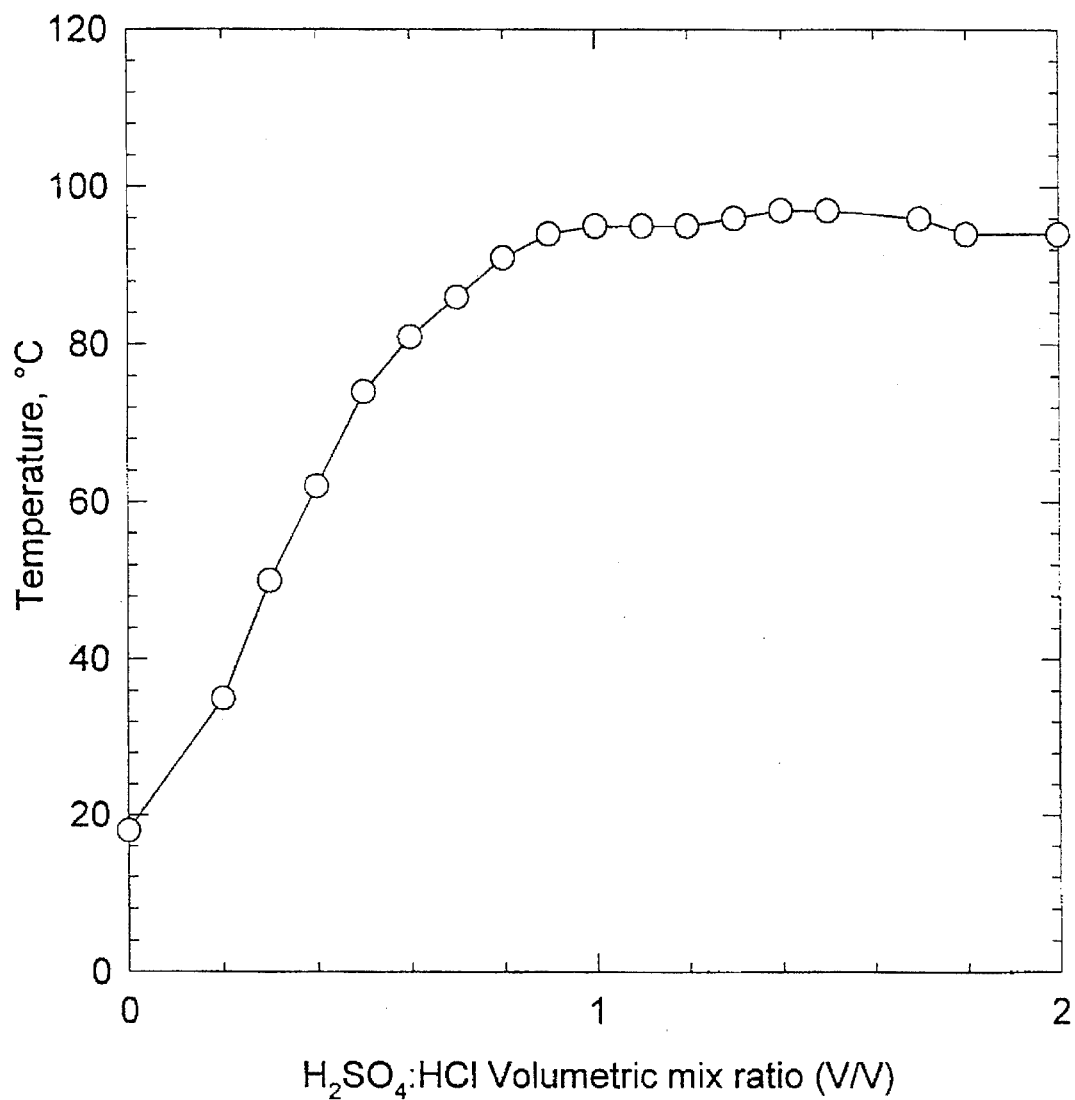
FIG. 9 is a graph showing temperature rise due to mixing of HCl and $H_2SO_4$.

The mixing of sulfuric acid with HCl mixture was found to be highly exothermic. The heat of mixing caused the temperature to rise to approximately 100° C., as shown in FIG. 9 This temperature rise probably assists in the evolution of HCl gas from the solution by further increasing the HCl vapor pressure.

The HCl concentration in the reconstituted solution can be increased over the concentration in the spent solution. In one example, the reconstituted solution has a normality of 4.5, which is 2.6 times the original normality of 1.76. The increase in concentration was achieved by using a smaller volume of liquid in the absorption column than the volume of HCl solution added to the mix vessel.

B. HF Recovery.

Contaminated HF was prepared utilizing a method similar to that used in the HCl examples.

Two HF recovery experiments were performed using the following procedure, the first utilizing phosphoric acid as a low vapor pressure additive and the second utilizing sulfuric acid as the low vapor pressure additive:

1. The mix vessel was charged with a contaminated HF and water. The normality of the HF solution was 3.0 (a 10:1 dilution).

2. The absorber column was filled with a measured amount of high purity DI water.

3. The burette was filled with an amount of low vapor pressure additive sufficient to create a 1:1 volumetric mix with the HF solution.

4. The low vapor pressure additive was added to the mix vessel over a 1–3 minute period. The heat of mixing between phosphoric acid and HF raised the temperature to approximately 40° C. The heat of mixing between sulfuric acid and HF raised the temperature to approximately 100° C.

5. Once all the low vapor pressure additive was added, the mixture was distilled until the temperature reached 170°–175° C., while maintaining a nitrogen gas purge. The purge gas flow rate was controlled at approximately 20 milliliters/minute.

Figure 13:
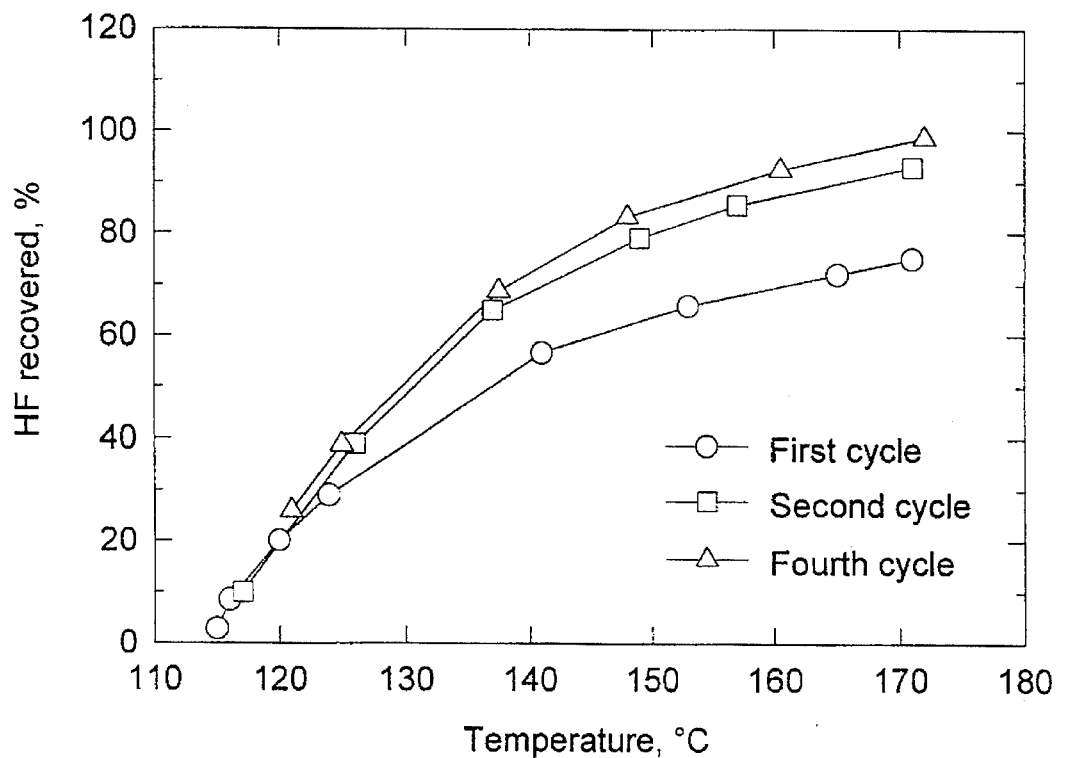
FIG. 13 is a set of graphs showing HF recovery by distillation with phosphoric acid.
Figure 13:
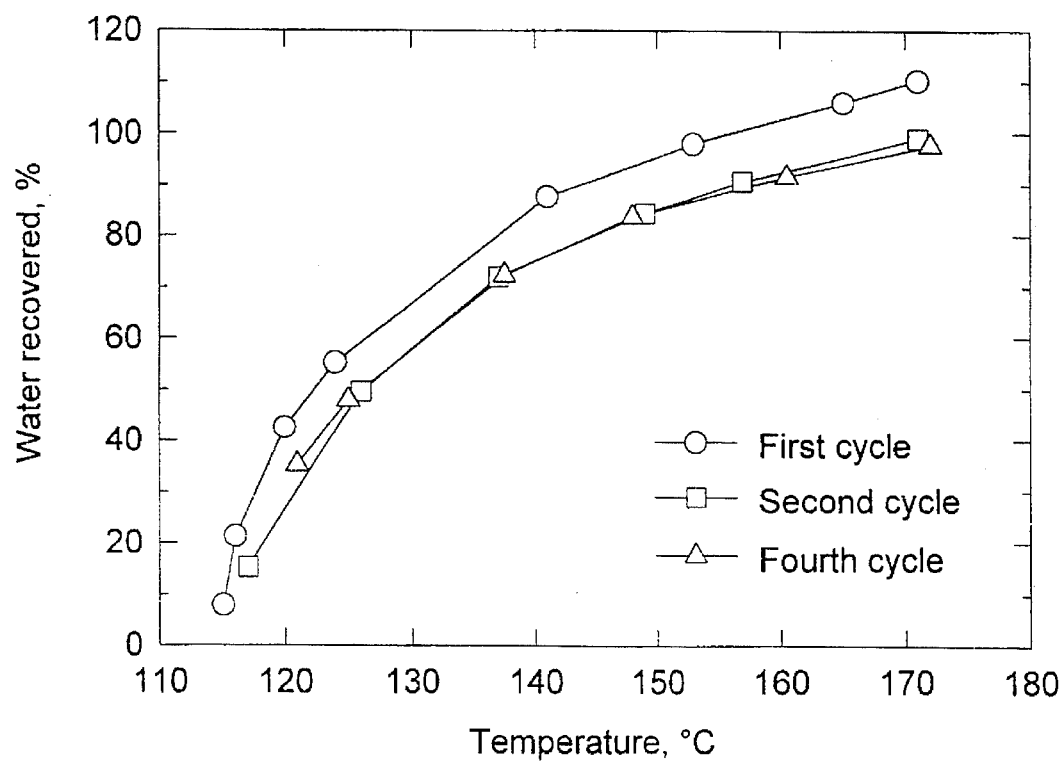

Referring to FIG. 13, multiple recovery cycles were run using the same phosphoric acid as the low vapor pressure additive. The rate of recovery increased with each cycle. It appears that this is due to the equilibration between the chemicals. The distillate must have the same composition of volatile species (acid gas and water) as the incoming chemical such that the solution input to the column is output minus the contaminants. In this way the low vapor pressure compound acts as a contaminant scavenger.

Figure 14:
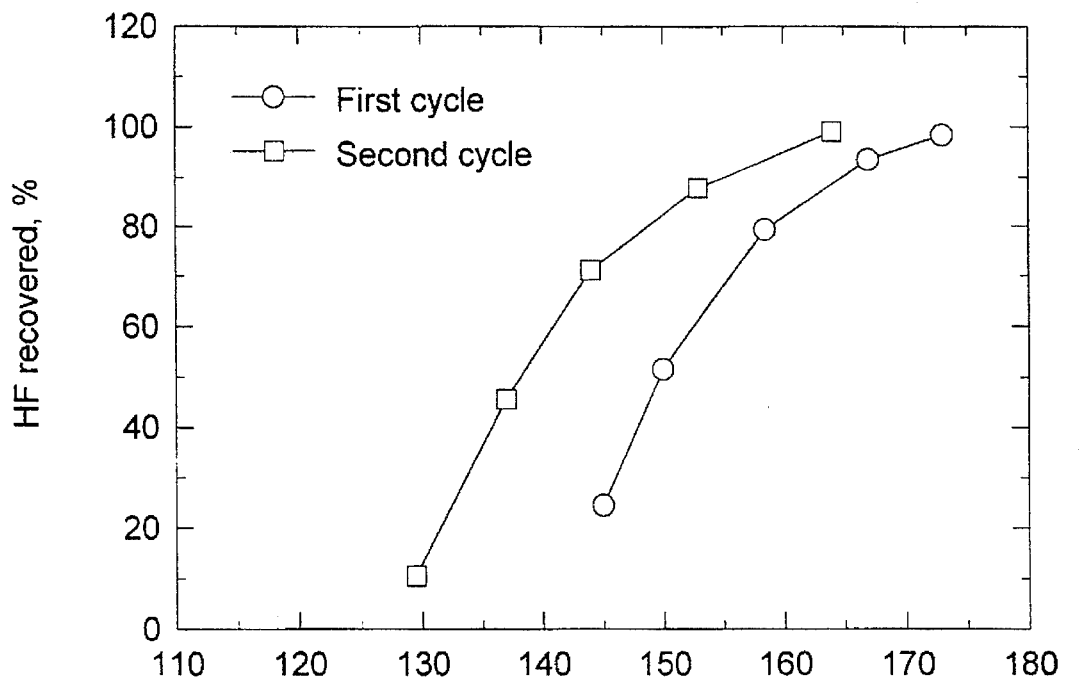
FIG. 14 is a set of graphs showing HF recovery by distillation with sulfuric acid.
Figure 14:
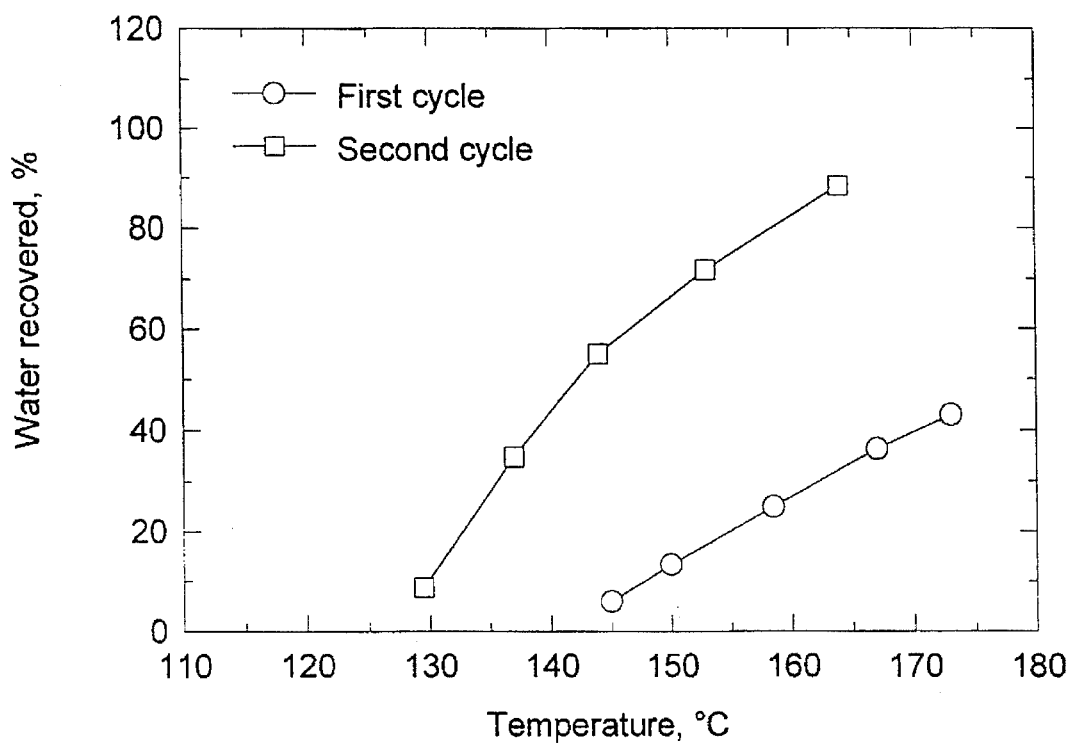

Referring to FIG. 14, multiple cycles were also run using sulfuric acid as the low vapor pressure additive.

FIG. 15 shows the purity of HF regenerated in a run utilizing sulfuric acid. In this example, HF was spiked with 9000–20,000 ppb of the elements shown. The distillate contained between<0.1 to 2.3 ppb of the respective elements. Removal efficiencies ranged from 99.98 to>99.999%. The separation was achieved utilizing a single stage still. It is expected that multistage distillation could yield contaminant concentrations of less than 0.1 ppb. The purity of HF regenerated in a run utilizing phosphoric acid was indicated by a clear distillate after a five cycle run, while the residual phosphoric acid containing the metal impurities was blue.

4. Summary

This invention provides a method to achieve closed loop wafer cleaning processes using ultra high purity chemicals. This process produces aqueous HCl and HF solutions of a purity that exceeds that of commercially available chemicals. The increased purity is expected to improve the manufacturing yield of the ULSI devices, thus reducing their manufacturing cost. It would also be expected to improve the performance and reliability of the ULSI devices.

The ability of this process to recycle spent HCl, HF, HBr, and HNO$_3$ in the manufacturing process will reduce chemical purchase and disposal costs. In addition, the amount of chemical released into the environment will be greatly reduced. The reduced cost of manufacturing ULSI devices along with improved device performance is expected to improve the competitiveness of the US semiconductor industry, an industry which has suffered from severe foreign competition in recent years.

As many changes are possible to the embodiments of this invention utilizing the teachings thereof, the descriptions above and the accompanying drawings should be interpreted in the illustrative and not the limited sense.

That which is claimed is:

1. A closed loop process involving use, purification, recovery and reuse of an acid in a wafer surface conditioning process, comprising:

(a) conditioning the surface of a wafer with an acid selected from the group consisting of hydrochloric acid, hydrofluoric acid, hydrobromic acid, nitric acid, whereby the acid is contaminated with matter removed from the surface of the wafer;

(b) adding a low vapor pressure liquid adjuvant to an azeotrope forming aqueous solution of the contaminated acid at a volumetric ratio of adjuvant to contaminated aqueous solution of about 0.4:1 to 2:1 to form a reaction mixture whereby the azeotrope forming attribute of the contaminated solution is broken;

(c) separating the reaction mixture to form a primary acid-depleted adjuvant-containing contaminated aqueous liquid phase and a primary acid-enriched, adjuvant-depleted, substantially contaminant free, water vapor containing gaseous phase;

(d) separating the contaminated primary liquid phase into a secondary adjuvant-depleted, contaminated aqueous liquid phase and a secondary adjuvant-enriched, substantially contaminant free, water vapor containing gaseous phase;

(e) reconstituting the primary gaseous phase to form a purified acid with a purity effective for use in a wafer surface conditioning process; and (f) conditioning the surface of a wafer with the purified acid.

2. The method of claim 1 wherein said low vapor pressure liquid adjuvant is selected from the group consisting of sulfuric acid and phosphoric acid.

3. The method of claim 1 wherein said separation of the reaction mixture is accomplished via distillation.

4. The method of claim 1 wherein said separation of the reaction mixture is accomplished via inert gas purging.

5. The method of claim 4 wherein said inert gas is added to the reaction mixture at a rate of approximately 0.02 to 0.4 milliliters of gas per minute per milliliter of contaminated solution.

6. The method of claim 4, wherein said inert gas is purged through said reaction mixture.

7. The method of claim 4, wherein said inert gas is purged across the surface of said reaction mixture.

8. The method of claim 1 wherein said separation of the reaction mixture is accomplished via both distillation and inert gas purging.

9. The method of claim 1 wherein said reconstitution is accomplished via absorption with water.

10. The method of claim 9 wherein an amount of water sufficient to yield between 0.4 normal and 4.5 normal aqueous acid is used in said absorption.

11. The method of claim 1 wherein said reconstitution is accomplished via condensation.

12. The method of claim 1 further comprising reconstituting the secondary gaseous phase to form a substantially contaminant free low vapor pressure liquid adjuvant source with a purity suitable for reuse in the wafer surface conditioning process.

13. The method of claim 1 wherein said separation of the primary liquid phase is accomplished via distillation.

* * * * *